Figure 1:
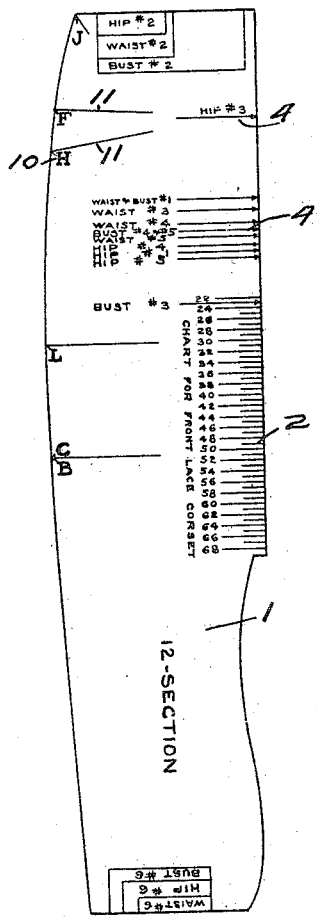

E. M. JACKSON.
PATTERN MAKING INSTRUMENT.
APPLICATION FILED JUNE 24, 1916.

1,241,121.

Patented Sept. 25, 1917.
2 SHEETS—SHEET 1.

INVENTOR
Elizabeth M. Jackson,
by
Owen Owen Crampton

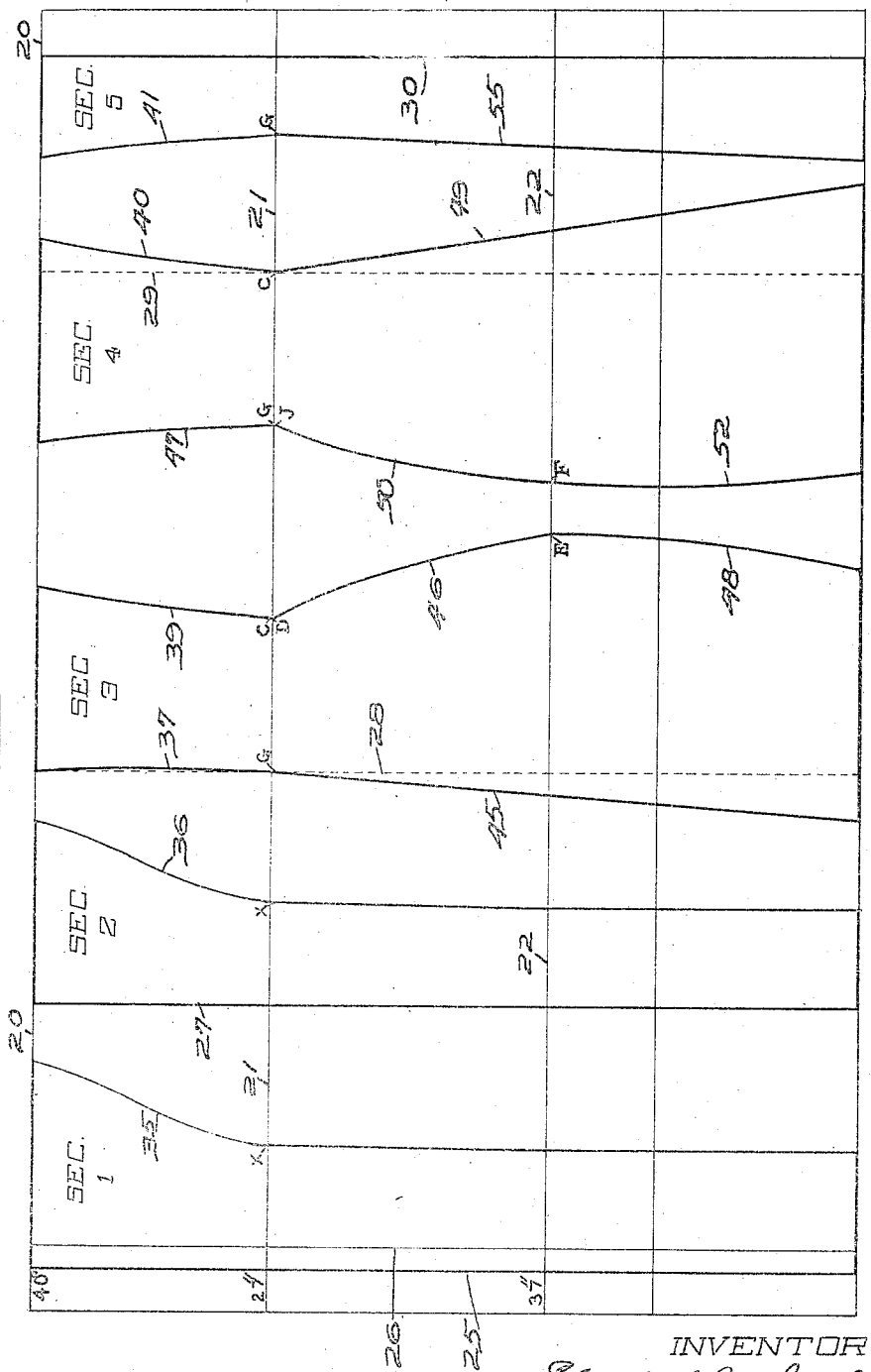

UNITED STATES PATENT OFFICE.

ELIZABETH M. JACKSON, OF TOLEDO, OHIO.

PATTERN-MAKING INSTRUMENT.

1,241,121.  Specification of Letters Patent.  Patented Sept. 25, 1917.

Application filed June 24, 1916. Serial No. 105,598.

*To all whom it may concern:*

Be it known that I, ELIZABETH M. JACKSON, a citizen of the United States, and a resident of Toledo, in the county of Lucas and State of Ohio, have invented a certain new and useful Pattern-Making Instrument; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to an instrument or tool for the laying out of patterns for corsets. It has for its object to provide an instrument which, with any given body measurements, particularly those around the trunk of the body, the pattern sections may be readily formed. The instrument provides a means for proportioning the pattern sections so that when the corset is formed it will fit the person from whom the body measurements are taken. Certain method of procedure is necessary for the proper use of the instrument, but my invention consists in an instrument having means for determining limiting points and configuration of edges of the different sections of a corset, which, when formed, will produce a perfect fit for the person from whom the body measurements are taken. The instrument is also provided with curved edges and points thereon for determining the curvature of the different sections of the corset, in order that a perfect fit may be produced. Measurements of one or more sections may be purely arbitrary, but such arbitrary selections, in combination with the points or measurements determined in the use of the instrument produce a perfect fit, no matter what the body measurements may be.

In the drawings I have illustrated the instrument containing my invention and also one of the patterns which are determined by the instrument upon given body measurements. Any set of body measurements within the limitations of the normal human body may be selected and a perfect fitting corset will be formed by the use of the instrument.

Figure 2:
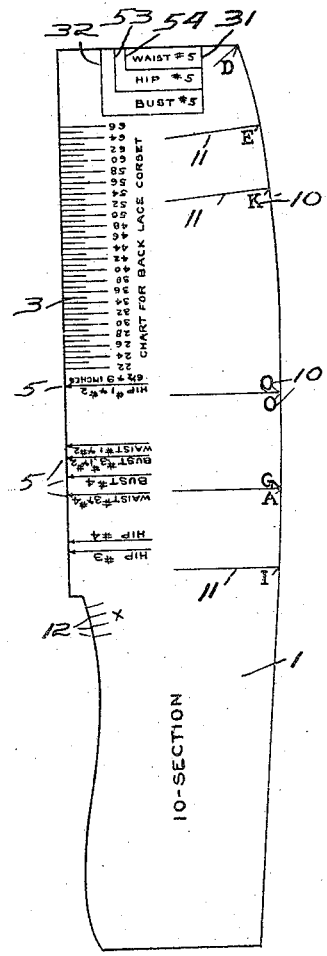

Figure 1 illustrates one side of the instrument embodying my invention, and Fig. 2 illustrates the opposite side. Fig. 3 illustrates a set of patterns for a corset. The particular corset selected is a ten-section back-lace corset. Five sections form one side or one half of the corset and consequently the sections may be cut in pairs, or the same pattern may be used for two sections.

The instrument 1 is provided with a scale having a plurality of equal divisions which are numbered consecutively from one end of the instrument. The instrument also has a plurality of starting points to be used in connection with the scale for measurements of different parts of the pattern for corsets. If desired, starting points may be provided for corsets of different kinds such as for corsets having ten, twelve, fourteen, etc. sections. For the corsets having different sections different colored starting points may be used, or, if desired, the same scale may be placed along different portions of edges of the instrument or on opposite sides of the instrument. In the instrument shown in the drawing the scales 2 and 3 are located on opposite sides of the instrument. In conjunction therewith are a plurality of predetermined points 4 and 5, which form the starting point of measurement in the use of the scales 2 and 3. The numbers used in the scales 2 and 3 indicate no proportionate distance from the starting points 4 and 5, but they determine the controlling marginal points of the sections, as hereinafter clearly described. Both sides of the instrument are provided with certain letters 10, which correspond to certain portions of the sections of different kinds of corsets, and the portions of the instrument having the letters are placed in juxtaposition to the portions of the sections to which they correspond, and following certain methods of operation the edges of the sections are determined. The instrument is also provided with lines 11 which terminate at the lettered points 10, which determine the direction of the edges of the instrument when the determining points have been located, the instrument being so placed that certain of the lines 11 substantially coincide with certain transverse lines, as hereinafter described. One side of the instrument 1 is provided with a plurality of marks X, one or the other of which may be used according to judgment as to height, fullness, etc., of the person, for determining one or more edges or portions of edges of the sections.

In cutting sections of a corset the pattern is first cut, and in order to determine the configuration of the sections of the pattern certain body measurements, after the manner well known in the art, are taken. Measurements around the body at the bust line, at the waist line and at the hip line are taken, also vertical body measurements between these lines are taken.

For purposes of illustration it is supposed that the bust of the party in question is 40, that the waist is 27 and the hip is 37. The lines indicating these measurements at the proper distances apart are then drawn on paper or other material from which the pattern is to be cut. The upper edge of the paper 20 may be the bust line. The line 21 is the waist line, which, in the particular case selected for illustration, is 5½ inches below the bust line. The line 22 is the hip line, which, in the particular instance, is 6½ inches below the waist line.

Draw the line 25, and ½ inch to the right thereof draw the line 26. Then place the starting point of the side shown in Fig. 2 of the instrument marked "Bust Nos. 1, 2 and 3" on the intersection of the lines 26 and 20, and mark on the line 20 the bust measurement 40, found on the scale 3 shown in Fig. 2. Draw also the line 27 which is located parallel with the end edges of the sheet. Place starting point indicated by "Bust Nos. 1, 2 and 3" on the intersecting point of lines 27 and 20, and mark on 20 the bust measurement 40 as found on the scale 3. Dot a vertical line 28 parallel to the end edges of the sheet and again place the starting point indicated by "Bust Nos. 1, 2 and 3" at the intersecting point of the lines 28 and 20, and again mark the measurement 40 as taken from the scale 3 on the line 20. Dot the line 29 and measure forward, that is, to the right, ½ inch on the line 20 from the intersection of the lines 20 and 29, and place the scale division 40 on the newly marked point, and mark the starting point indicated by "Bust No. 4", that is, to the left of the line 29. The section 5 is an arbitrarily measured section based on the experimental use of the instrument. The measurements of section 5 are indicated at the upper end of the instrument on the side shown in Fig. 2. Draw a line 30 from which are measured negatively, that is, to the left, along the different lines which correspond to the lines of body measurements, the measurements indicated at the upper end of the side of the instrument shown in Fig. 2. For the bust measurement of section 5, on the line 20, lay off the distance between the zero line 31 to the line 32 from the line 30 of the pattern.

From the line 26 on the waist line 21 lay off the waist measurements by placing the starting point indicated by "Waist Nos. 1 and 2", and marking the point No. 27, which is the number of inches that the waist of the person in question measures. Then at the point X of the line 21 place according to judgment one of the points marked X on the instrument, and the edge of the instrument also on the measured point of the bust for that section, as previously determined, and draw the line 35, which will give the contour of the edge of this portion of the section. Again lay the starting point marked "Waist Nos. 1 and 2" on the line 27, measuring along the line 21 by the scale, again marking the point 27 of the scale on the line 21. This is also marked with the letter X, and the contour of the line 36 is determined by placing one of the points marked X on the instrument on the point X of section 2, and placing the edge at the point of the bust measurement for section 2 previously determined and marked, and draw the line 36. Mark the intersection of lines 28 and 21, G. Then place the starting point marked "Waist Nos. 3 and 4" on the line 28, and measuring along the line 21, and mark the point 27, as found in the scale 3, and mark this point C. Then place the point G of the instrument on the point G marked on the section, and the edge of the instrument on the starting point of the bust measurement of section 3, and draw the line 37. This will determine the edge at this portion of section 3 of the pattern. Then place C found on the side of the instrument shown in Fig. 1 at the point marked C on section 3 of the pattern, and place the edge of the instrument on the determining point of the bust line of section 3, and draw a line. This determines the portion 39 of that edge of the section. Then place the divisional point 27 on the intersection of lines 21 and 29 and mark the starting point marked "Waist Nos. 3 and 4" on the line 21. Then place letter C on the point marked C, and the edge of the scale on the point of the bust line 20 previously determined, and draw the line 40, which determines the edge of that portion of section 4 on the pattern. Then place G of the instrument on G of section 4 and draw the line 47 to the previously determined point in the bust line. Then place the zero line 31 on the intersection of lines 21 and 30, and measure negatively on the line 21 to the line 54 of the scale, and then place the G point of the instrument on the G point marked on section 5, and the edge of the instrument on the point on the line 20 previously determined, and draw the line 41, which determines that portion of the edge of the section.

For the hip measurements of the sections place the starting point marked "Hip Nos. 1 and 2" on the intersection point of the lines 26 and 22, and mark on the line 22 the division point measuring 37, which is also the hip body measurement in inches of the person for whom the corset is made. Then draw a straight line from the point X on the line 21 through the point just determined by the scale, on line 22. Do the same with reference to section 2 of the pattern. Then measure negatively from the intersection of line 28 and line 22, 1 inch, and draw a straight line from the point G through the point just determined on line 22. Then place the starting point marked "Hip No. 3" on the scale on the intersection of lines 45 and 22, and measure by the scale the hip measurement taken in inches on the person, that is, mark the division 37 as indicated by the scale. Then place the point D on the scale on the point D marked on the section 3, and draw to the point E just determined, which determines the contour of the edge portion 46. Then place the point E of the scale on the point E just determined, and so that the line 11 of the scale, which terminates in the point E of the scale, coincides with the line 22, and draw the line 48, which determines that portion of the pattern. Measure ¾ inch positively, that is, to the right of the line 29, on the line 22. Then draw a straight line from the point C of section 4 through the newly determined point. Then measure negatively from the line 49 just determined on the line 22, by placing the scale division No. 37 at the point of intersection of lines 49 and 22, and marking the hip starting point designated by "Hip No. 4" on the line 22. Then place the point J of the scale on the point J of section 4 and draw to the newly determined point on the line 22. This gives the line 50, which determines this portion of the pattern. Then place the point F of the scale on the point F of the section, and so that the line 11 of the scale which terminates in the point F of the scale coincides with the line 22, and draw a line, which determines the portion 52 of the pattern. Then place the zero line 31 on the upper end of the scale on line 30, and mark the point determined by the line 53 on the line 22, which determines the width at the hip of section 5. Then draw a straight line 55 from G through this newly determined point, which determines this portion of section 5 of the pattern.

A twelve section front or back laced corset is determined in substantially the same way, using the same principle of operation with, however, certain proper arbitrary methods and measurements, but following the same general plan as outlined in the method of producing the ten section corset, as heretofore described.

The invention may be modified by those skilled in the art without departing from the spirit thereof.

Having thus described my invention, what I claim as new, and desire to secure by Letters Patent, is—

1. An instrument to be used in pattern making having thereon a scale, the scale having a plurality of numbers each corresponding to a division line of the scale and a plurality of starting points which each corresponds to a particular body line, the distances between the starting points corresponding to any body line, and the division point of the scale designated by a number which is the same as that designating the body measurement along said line, having a fixed ratio to the said measurement and constituting a dimension of a properly formed pattern portion as measured along a line corresponding to said body line.

2. An instrument to be used in pattern making having thereon a scale, the scale having a plurality of numbers each corresponding to a division line of the scale and a plurality of starting points which each corresponds to a particular body line, the distances between the starting points corresponding to any body line, and the division point of the scale designated by a number which is the same as that designating the body measurement along said line, having a fixed ratio to the said measurement and constituting a dimension of a properly formed pattern portion as measured along a line corresponding to said body line, the said instrument having curved edges and designating letters which when placed at points determined by the scale and the edges of the instrument placed on other points determined by the scale, determine the contour of the pattern between lines of measurement of the pattern beginning at the letter designating points and ending at the said other points of the pattern measure.

3. An instrument to be used in pattern making having thereon a scale, the scale having a plurality of numbers each corresponding to a division line of the scale and a plurality of starting points which each corresponds to a particular body line, the distances between the starting points corresponding to any body line, and the division point of the scale designated by a number which is the same as that designating the body measurement along said line, having a fixed ratio to the said measurement and constituting a dimension of a properly formed pattern portion as measured along a line corresponding to said body line, the said instrument having curved edges and designating letters and straight lines terminating in the designating letters, the edges beginning at the points marked by the letters determining the contour of the pattern when the lines of the instrument are placed so as to coincide with the lines of measurement of the pattern.

In testimony whereof, I have hereunto signed my name to this specification.

ELIZABETH M. JACKSON.

Copies of this patent may be obtained for five cents each, by addressing the "Commissioner of Patents, Washington, D. C."